United States Patent
Song et al.

(10) Patent No.: US 10,489,009 B2
(45) Date of Patent: Nov. 26, 2019

(54) USER INTERFACE FACILITATING MESH GENERATION

(71) Applicant: Adobe Inc., San Jose, CA (US)

(72) Inventors: Yuyan Song, Milpitas, CA (US); Sarah Kong, Cupertino, CA (US); Alan L Erickson, Highlands Ranch, CO (US); Bradee R. Evans, Alameda, CA (US); Aseem O. Agarwala, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/180,956

(22) Filed: Nov. 5, 2018

(65) Prior Publication Data

US 2019/0073093 A1    Mar. 7, 2019

Related U.S. Application Data (63) Continuation of application No. 14/473,402, filed on Aug. 29, 2014, now Pat. No. 10,120,523.

(51) Int. Cl.

| | | |
|---|---|---|
| *G06F 3/048* | (2013.01) | |
| *G06F 3/0481* | (2013.01) | |
| *G06F 3/0484* | (2013.01) | |
| *G06F 3/0486* | (2013.01) | |
| *G06F 3/01* | (2006.01) | |

(52) U.S. Cl.
CPC .......... *G06F 3/0481* (2013.01); *G06F 3/0486* (2013.01); *G06F 3/04845* (2013.01)

(58) Field of Classification Search
CPC ... G06F 3/0481; G06F 3/04845; G06F 3/0486
See application file for complete search history.

(56) References Cited

U.S. PATENT DOCUMENTS

| | | | | |
|---|---|---|---|---|
| 5,945,996 A | * | 8/1999 | Migdal | G06T 17/20 345/420 |
| 6,342,886 B1 | * | 1/2002 | Pfister | G06T 13/20 345/419 |
| 6,389,375 B1 | * | 5/2002 | Thomsen | G06T 17/10 345/420 |

(Continued)

OTHER PUBLICATIONS

"Advisory Action", U.S. Appl. No. 14/473,402, dated Jan. 10, 2018, 3 pages.

(Continued)

*Primary Examiner* — Nicholas Augustine
(74) *Attorney, Agent, or Firm* — SBMC (57) ABSTRACT

A mesh is a collection of multiple shapes referred to as elements, each of which can share an edge with one or more other elements of the mesh. The mesh is presented to the user on a display, and the user identifies a new element to be added to the mesh. User input is received to manipulate the new element (e.g., move the new element around the display). As the new element is manipulated, various conditions are applied to determine edges of elements existing in the mesh that the new element can be snapped to. Snapping a new element to an edge of an existing element in the mesh refers to adding the new element to the mesh so that the new element and the existing element share the edge. Indications of the edges of existing elements to which the new element can be snapped are provided to the user.

20 Claims, 8 Drawing Sheets

(56) References Cited

U.S. PATENT DOCUMENTS

| | | | | |
|---|---|---|---|---|
| 6,628,279 | B1* | 9/2003 | Schell | G06F 3/04845 345/420 |
| 6,996,505 | B1* | 2/2006 | Edelsbrunner | G06T 17/20 345/419 |
| 7,050,951 | B1* | 5/2006 | Tautges | G06F 17/50 345/419 |
| 7,995,054 | B2* | 8/2011 | Wheeler | G06K 9/00201 345/419 |
| 9,015,631 | B2* | 4/2015 | Queric | G06F 3/04845 715/836 |
| 9,047,704 | B2* | 6/2015 | Gary | G06F 17/50 |
| 10,120,523 | B2 | 11/2018 | Song et al. | |
| 2002/0133321 | A1* | 9/2002 | Perry | G06T 17/00 703/2 |
| 2009/0248184 | A1* | 10/2009 | Steingart | A61C 1/082 700/98 |
| 2003/0328924 | | 12/2013 | Arikan et al. | |
| 2013/0328924 | A1* | 12/2013 | Arikan | G06T 11/20 345/629 |
| 2014/0152662 | A1* | 6/2014 | Nowrouzezahrai | G06T 15/06 345/426 |
| 2014/0351727 | A1* | 11/2014 | Danton | G06F 3/0481 715/765 |
| 2015/0002510 | A1* | 1/2015 | Takayama | G06T 17/205 345/423 |
| 2016/0062622 | A1 | 3/2016 | Song et al. | |

OTHER PUBLICATIONS

"Final Office Action", U.S. Appl. No. 14/473,402, dated Aug. 28, 2017, 15 pages.

"First Action Interview Office Action", U.S. Appl. No. 14/473,402, dated Apr. 19, 2017, 3 pages.

"Notice of Allowance", U.S. Appl. No. 14/473,402, dated Jun. 27, 2018, 9 pages.

"Pre-Interview Communication", U.S. Appl. No. 14/473,402, dated Jan. 20, 2017, 3 pages.

* cited by examiner

USER INTERFACE FACILITATING MESH GENERATION

RELATED APPLICATION

This application is a continuation of and claims priority to U.S. patent application Ser. No. 14/473,402, filed Aug. 29, 2014 entitled "User Interface Facilitating Mesh Generation", the entire disclosure of which is hereby incorporated by reference herein in its entirety.

BACKGROUND

As computing technology has evolved various different uses for computers have been developed. One such usage is image editing programs that allow for the editing or creating of drawings, photos, and so forth. While these programs are useful, they are not without their problems. One such problem is that it can be difficult for users to interact with such image editing programs, resulting in unpleasant user experiences and user dissatisfaction with their computers.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a mesh including one or more elements is presented on a display. A new element to be added to the mesh is identified, and a user input indicating to manipulate the new element on the display is received. As the new element is manipulated on the display, edges of the one or more elements to which the new element can be snapped are determined, with snapping the new element to an edge of one of the one or more elements comprising adding the new element to the mesh so that the new element shares the edge with the one element. In response to the new element being situated at a location on the display at which the new element can be snapped to an edge of one of the one or more elements, an indication of the edge of the one element to which the new element can be snapped is provided.

In accordance with one or more aspects, an output module is configured to present a mesh including one or more elements on a display, and an input module is configured to receive a user input indicating to manipulate on the display a new element to be added to the mesh. A mesh generation system is configured to determine, as the new element is manipulated on the display, edges of the one or more elements to which the new element can be snapped, snapping the new element to an edge of one of the one or more elements comprising adding the new element to the mesh so that the new element shares the edge with the one element. The mesh generation system is also configured to provide, in response to the new element being situated at a location on the display at which the new element can be snapped to an edge of one of the one or more elements, an indication of the edge of the one element to which the new element can be snapped.

In accordance with one or more aspects, a mesh including multiple elements is displayed and a new element to be added to the mesh is identified. User input indicating to move the new element is received, and as the new element is moved, edges of the multiple elements to which the new element can be snapped are determined. Snapping the new element to an edge of one of the multiple elements comprises adding the new element to the mesh so that the new element shares the edge with the one element. In response to the new element being moved so that the new element can be snapped to an edge of one of the multiple elements, an indication of the edge of the one of the multiple elements to which the new element can be snapped is provided.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

A user interface facilitating mesh generation is discussed herein. A mesh is a collection of multiple shapes referred to as elements, each of which can share an edge with one or more other elements of the mesh. The elements can be 2D shapes such as quadrilaterals or triangles, or can be 3D shapes such as cubes. The mesh is presented to the user on a display, and the user identifies a new element to be added to the mesh.

User input is received to move the new element around the display or otherwise manipulate the element. As the new element is moved around or otherwise manipulated on the display, a determination is made as to which, if any, edges of elements existing in the mesh the new element can be snapped to. Snapping a new element to an edge of an existing element in the mesh refers to adding the new element to the mesh so that the new element and the existing element share the edge. An existing element in the mesh having an edge to which the new element can be snapped is also referred to as a candidate element, and the edge to which the new element can be snapped is also referred to as a candidate edge. Indications of the edges of existing elements in the mesh to which the new element can be snapped are provided to the user.

Various conditions are applied to determine whether a new element can be snapped to an edge of an existing element. Examples of such conditions include a proximity of an edge of the new element to the edge of the existing element, an angle between the edge of the new element and the edge of the existing element, and so forth. These various conditions are discussed in additional detail below. In response to determining that a new element can be snapped to an edge of an existing element, an indication of the edge of the existing element to which the new element can be snapped is provided. The indication can take various forms, such as highlighting the edge of the existing element. The user can then optionally provide any of a variety of user inputs to indicate he or she desires to snap the new element to the edge of the existing element.

Figure 1:
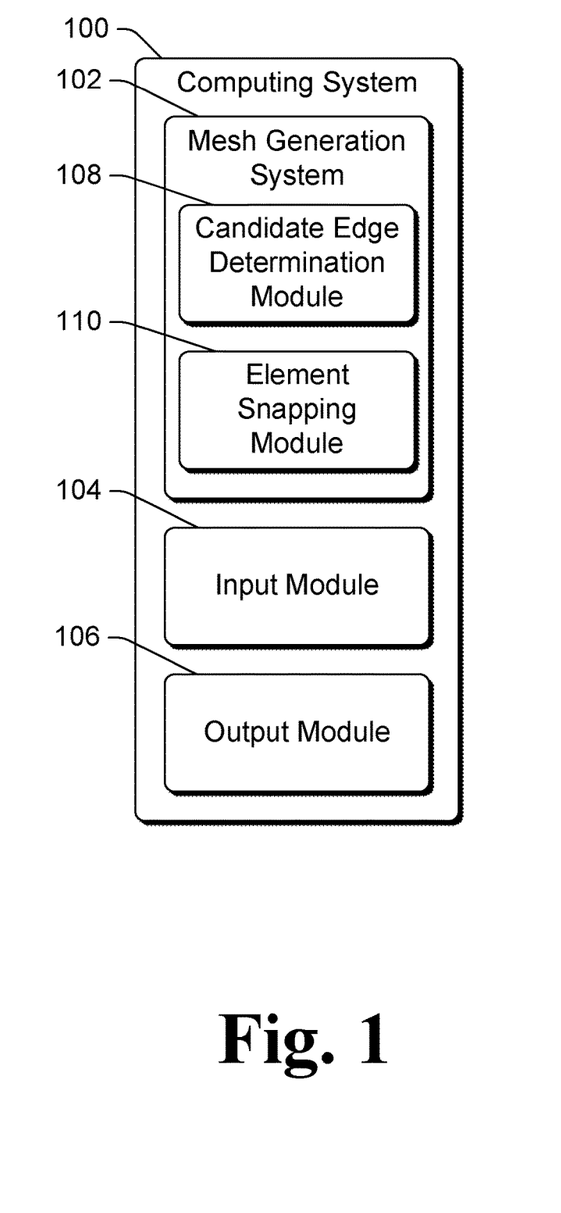
FIG. 1 is a block diagram illustrating an example computing system implementing the user interface facilitating mesh generation in accordance with one or more embodiments.

FIG. 1 is a block diagram illustrating an example computing system 100 implementing the user interface facilitating mesh generation in accordance with one or more embodiments. The computing system 100 can be implemented by one or more of a variety of different types of devices, such as a physical device or a virtual device. For example, the computing system 100 can be implemented by one or more physical devices such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. The computing system 100 can also be implemented by one or more virtual devices, such as a virtual machine running on a physical device. A virtual machine can be run on any of a variety of different types of physical devices (e.g., any of the various types listed above). Thus, the computing system 100 may range from a full resource device with substantial memory and processor resources (e.g., personal computers, game consoles) to a low-resource device with limited memory and/or processing resources (e.g., traditional set-top boxes, hand-held game consoles).

The computing system 100 includes a mesh generation system 102, an input module 104, and an output module 106. The input module 104 receives user inputs from a user of the computing system 100. User inputs can be provided in a variety of different manners, such as by pressing one or more keys of a keypad or keyboard of the system 100, pressing one or more keys of a controller (e.g., remote control device, mouse, trackpad, etc.) of the system 100, pressing a particular portion of a touchpad or touchscreen of the system 100, pressing one or more buttons of a controller, making a particular gesture on a touchpad or touchscreen of the system 100, or making a particular gesture on a controller (e.g., remote control device, mouse, trackpad, etc.) of the system 100, combinations thereof, and so forth. User inputs can also be provided in other manners, such as via audible inputs to a microphone, via motions of hands or other body parts observed by an image capture device, and so forth.

The output module 106 generates, manages, or outputs content for display, playback, and/or other presentation. This content can be created by output module 106 or obtained from other modules of computing system 100. This content can be, for example, a display or playback portion of a user interface (UI). The content can be displayed or otherwise played back by components of computing system 100 (e.g., speakers, interactive display devices, etc.). Alternatively, the output module 106 can generate one or more signals that are output to other devices or components (e.g., speakers, display devices, etc.) that are separate from computing system 100.

The mesh generation system 102 includes a candidate edge determination module 108 and an element snapping module 110. The candidate edge determination module 108 determines, as a new element is manipulated on the display, which edges of which existing elements in the mesh (if any) the new element can be snapped to. As the new element is manipulated on the display in response to user inputs received by the input module 104, which edges of which existing elements the new element can be snapped to changes. An edge that the new element can be snapped to at any given time is also referred to as a candidate edge for that given time. Indications (e.g., visual feedback) of the particular edges, if any, of particular elements to which the new element can be snapped are also provided by the candidate edge determination module 108.

The element snapping module 110 manages snapping of a new element to an edge of an existing element. Snapping a new element to a particular edge of an existing element in the mesh refers to adding the new element to the mesh so that the new element and the existing element share the particular edge. The new element is optionally modified by the element snapping module 110, such as by increasing or decreasing the length of the edge so that the length of the edge of the new element being added to the mesh is the same as the length of the edge of the existing element of the mesh that shares that edge with the new element.

Figure 2:
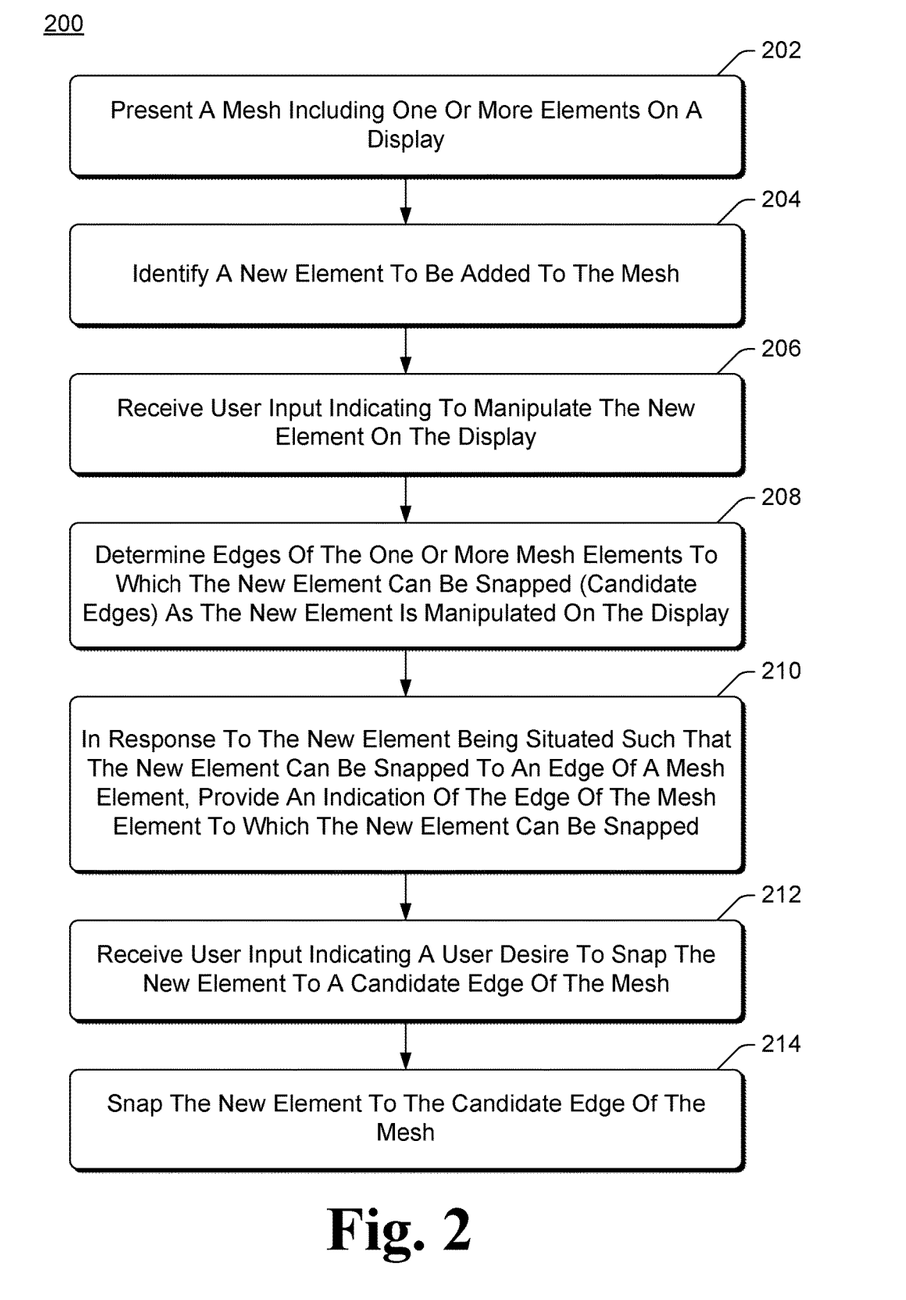
FIG. 2 is a flowchart illustrating an example process for implementing the user interface facilitating mesh generation in accordance with one or more embodiments.

FIG. 2 is a flowchart illustrating an example process 200 for implementing the user interface facilitating mesh generation in accordance with one or more embodiments. Process 200 is carried out by a computing system, such as computing system 100 of FIG. 1, and can be implemented in software, firmware, hardware, or combinations thereof. Process 200 is shown as a set of acts and is not limited to the order shown for performing the operations of the various acts. Process 200 is an example process for implementing the user interface facilitating mesh generation; additional discussions of implementing the user interface facilitating mesh generation are included herein with reference to different figures.

In process 200, a mesh including one or more elements is presented on a display (act 202). A mesh is a collection of multiple elements, each of which can share an edge with one or more other elements of the mesh. The elements of a mesh can be 2D shapes or polygons such as quadrilaterals (also referred to as quadruples), triangles, and so forth. The elements of a mesh can alternatively be 3D shapes such as cubes. In one or more embodiments, the mesh is a collection of 2D convex quadrilaterals.

A new element to be added to the mesh is identified (act 204). The new element is identified by a user input indicating the new element, or alternatively by another component or module of the computing system implementing process 200 indicating the new element. A user input can indicate the new element in a variety of different manners, such as user input drawing a shape of a new element, a user input selecting a new element from a gallery or menu of multiple different elements, a user input indicating to add a default or previously determined element, and so forth.

Figure 3:
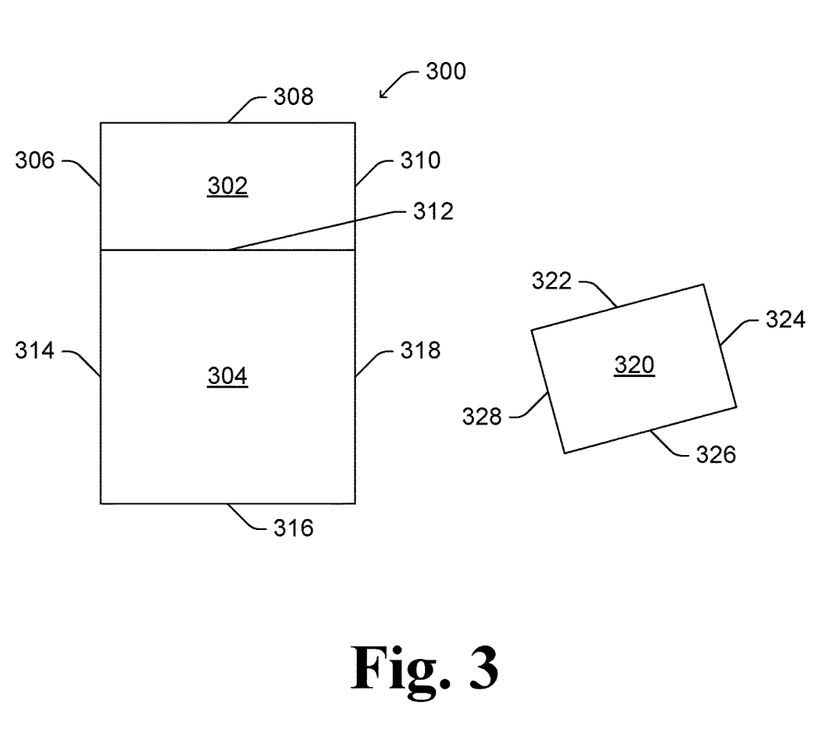
FIG. 3 illustrates an example presentation of elements on a display in accordance with one or more embodiments.

FIG. 3 illustrates an example presentation of elements on a display in accordance with one or more embodiments. A mesh 300 is illustrated, the mesh 300 including elements 302 and 304, both rectangles. Although only two elements 302 and 304 are illustrated as being part of the mesh, a mesh can include any number of elements. Element 302 includes edges 306, 308, 310, and 312, and element 304 includes edges 312, 314, 316, and 318. Each element 302 and 304 includes edge 312, which is also referred to as elements 302 and 304 sharing edge 312.

A new element 320 is identified as to be added to the mesh. The new element includes edges 322, 324, 326, and 328. In the illustration of FIG. 3, the new element 320 has not yet been added to the mesh 300 and the new element 320 shares no edges with elements 302 or 304.

Returning to FIG. 2, user input indicating to manipulate the new element on the display is received (act 206). Manipulation of the element refers to a change in the location of the element, the orientation of the element, the size of the element, the shape of the element, or a combination thereof. For example, manipulation of the element can be moving the element to a different location on the display, rotating the element about an axis of the element (e.g., the x-axis or y-axis for a 2D element, or the x-axis, y-axis, or z-axis for a 3D element) or about a combination of axis, resizing the element (e.g., moving one or more edges of the element), reshaping the element (e.g., moving one or more vertices of the element), and so forth. It should be noted that restrictions on the ability to manipulate elements can optionally be enforced. For example, although user input moving a vertex of an element may be received, movement of the vertex may be restricted so that the element remains a convex element (e.g., a convex quadrilateral).

As the new element is manipulated on the display, edges of the one or more elements existing in the mesh to which the new element can be snapped are determined (act 208). Snapping a new element to a particular edge of an existing element in the mesh refers to adding the new element to the mesh so that the new element and the existing element share the particular edge. An existing element in the mesh having an edge to which the new element can be snapped is also referred to as a candidate element, and the candidate elements can change over time as the new element is manipulated. The edge to which the new element can be snapped is also referred to as a candidate edge, and the candidate edges can change over time as the new element is manipulated.

Whether a particular edge in the mesh is a candidate edge is determined by determining whether various conditions regarding the candidate edge, candidate element, and the new element are satisfied. These various conditions are discussed in further detail below.

In response to the new element being situated such that the new element can be snapped to an edge of an existing mesh element, an indication of the edge of the mesh element to which the new element can be snapped is provided (act 210). Thus, as the element is manipulated, candidate edges (if any) at any given time during the manipulation are identified. This allows the user to readily see at any given moment as he or she moves or otherwise manipulates the new element, which edges of existing elements the new element can be snapped to.

The indication in act 210 is thus an indication of candidate edges, and the indication can take various forms. The indication can take any form that allows the candidate edge to be distinguished from other edges in the mesh. For example, the indication can be a highlight of the candidate edge in a particular color. By way of another example, the indication can be a change in appearance of the candidate edge (e.g., a change in color of the candidate edge, a change in line pattern (e.g., from solid to dashed) of the candidate edge, a change in thickness of the candidate edge, a change in brightness of the candidate edge, a flashing or other animation of the candidate edge, and so forth). By way of further examples, the indication can be a change in the appearance of edges other than the candidate edge (e.g., a change in color of the edges other than the candidate edge, a change in line pattern (e.g., from solid to dashed) of the edges other than the candidate edge, a change in thickness of the edges other than the candidate edge, a change in brightness of the edges other than the candidate edge, a flashing or other animation of the edges other than the candidate edge, and so forth).

The indication can also be other non-visual forms of feedback to the user. For example, an audible indication (e.g., a particular tone or sound) can be played back to the user when a candidate edge has been identified. By way of another example, a haptic indication (e.g., a shaking or other movement of a mouse or other input device) can be provided when a candidate edge has been identified.

An indication of the edge of the new element that will be shared with the edge of the existing element as a result of the snapping can also optionally be provided. The indication can take various forms, analogous to the indication of the candidate edges. The indication of the edge of the new element can be the same indication (e.g., highlighting the edge in the same color) as the indication of the candidate edge, or alternatively the indication can be different (e.g., highlighting the edge of the new element in a different color than the candidate edge).

A user input indicating a user desire to snap the new element to a candidate edge of a candidate element of the mesh is received (act 212). This user input can take various forms, such as clicking of a mouse button, releasing of a mouse button, selecting a menu item, selecting a button, and so forth. This user input can be receive in any of a variety of different manners, as discussed above. In response to the user input, the new element is snapped to the candidate edge (act 214). After snapping, the new element is part of the mesh, and process 200 can be repeated for additional new elements.

However, if no user input is received indicating a user desire to snap the new element to a candidate edge of a candidate element, then various actions can be taken. For example, the new element can be returned (e.g., to the location) as it was prior to receiving the user input indicating to manipulate the new element (in act 206), the new element can be placed in a default or other known location, the new element can be deleted, and so forth.

Figure 4:
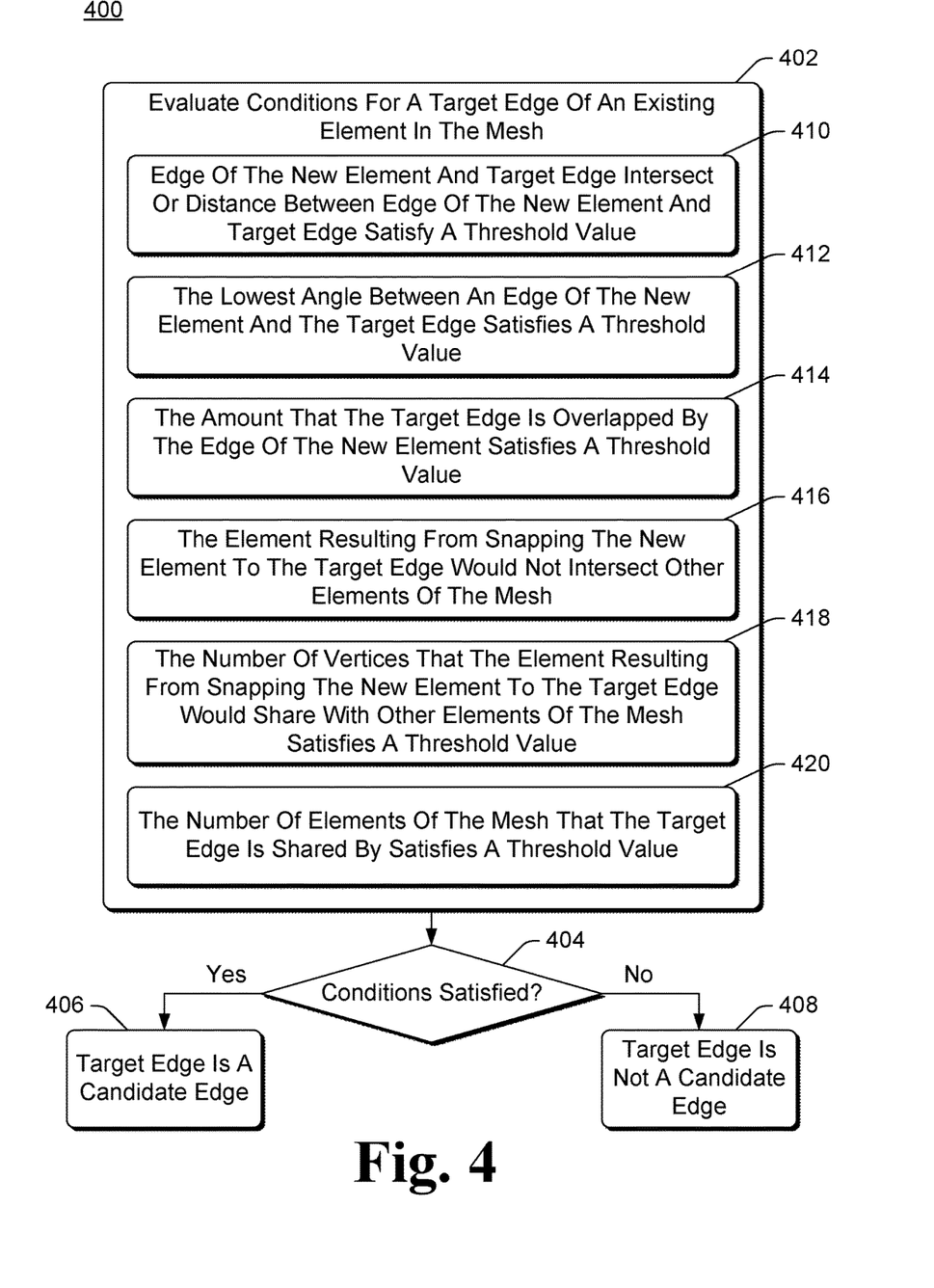
FIG. 4 is a flowchart illustrating an example process for determining whether a particular edge of an element in a mesh is a candidate edge in accordance with one or more embodiments.

FIG. 4 is a flowchart illustrating an example process 400 for determining whether a particular edge of an element in a mesh is a candidate edge in accordance with one or more embodiments. Process 400 is carried out by a computing system, such as computing system 100 of FIG. 1, and can be implemented in software, firmware, hardware, or combinations thereof. Process 400 can implement, for example, act 208 of FIG. 2. Process 400 is shown as a set of acts and is not limited to the order shown for performing the operations of the various acts. Process 400 is an example process for determining whether a particular edge of an element in a mesh is a candidate edge; additional discussions of determining whether a particular edge of an element in a mesh is a candidate edge are included herein with reference to different figures.

In process 400, various conditions are evaluated for a target edge of an existing element in a mesh (act 402). The target edge refers to an edge of an existing element that is being or can be evaluated to determine whether the edge is a candidate edge. The various conditions involve an edge of the new element and the target edge. The process 400 can be performed for each of multiple edges of each of multiple elements in the mesh.

A determination is made as to whether the conditions are satisfied for a target edge (act 404). In response to the conditions being satisfied for a target edge, the target edge is a candidate edge (act 406). However, in response to the conditions not being satisfied for a target edge, the target edge is not a candidate edge (act 408).

Various different conditions are evaluated in act 402. The conditions evaluated in act 402 include an edge intersection condition 410, an angle condition 412, an overlap condition 414, an element intersection condition 416, an element vertex sharing condition 418, and an edge sharing condition 420. These conditions can be evaluated in any order.

Various references are included herein to a value satisfying a threshold value. A particular value satisfies a threshold value if the particular value is less than the threshold value, or alternatively if the particular value is less than or equal to the threshold value.

In one or more embodiments, all of the conditions 410-420 are to be satisfied in order for the target edge to be a candidate edge. Alternatively, only a subset of the conditions 410-412 need be satisfied in order for the target edge to be a candidate edge. For example, a target edge may be a candidate edge even if the overlap condition 414 is not satisfied.

The edge intersection condition 410 is satisfied if the edge of the new element and target edge intersect or the distance between the edge of the new element and the target edge satisfies a threshold value. In one or more embodiments, the edges of the new element and the edges of the elements in the mesh are extruded, the extruded area for an edge extending outward perpendicularly from the edge. If the extruded areas of the edge of the new element and the target edge intersect, then the edge intersection condition 410 is satisfied.

The amount that the edges of the elements are extruded can vary. In one or more embodiments, the amount that the edges are extruded is determined based on the interaction threshold under the current zoom level. The interaction threshold can be a mouse click threshold (e.g., how far a pointer controlled by a mouse or other input device can be moved after a mouse or other input device button is pressed and still have the pressing of the button be considered a mouse or other input device "click" or selection) at the current zoom level (e.g., the current zoom level for the screen—how much the screen is zoomed in or out). For example, the amount that the edges are extruded can be determined according to the calculation E=C×100/Z, where E refers to the amount of edge extrusion, C refers to the mouse click threshold, and Z refers to the current zoom level percentage. Thus, if the mouse click threshold is 10 pixels and the current zoom level is 100%, then the extrusion amount is 10 pixels. Or, if the mouse click threshold is 10 pixels and the current zoom level is 10%, then the extrusion amount is 100 pixels. Alternatively, the amount that the edges of the elements are extruded can be determined in other manners, such as being a particular number of pixels of the display (e.g., in the range of 2-10 pixels), being based on a length of the edge (e.g., in the range of 2%-5% of the length of the edge), and so forth.

Figure 5:
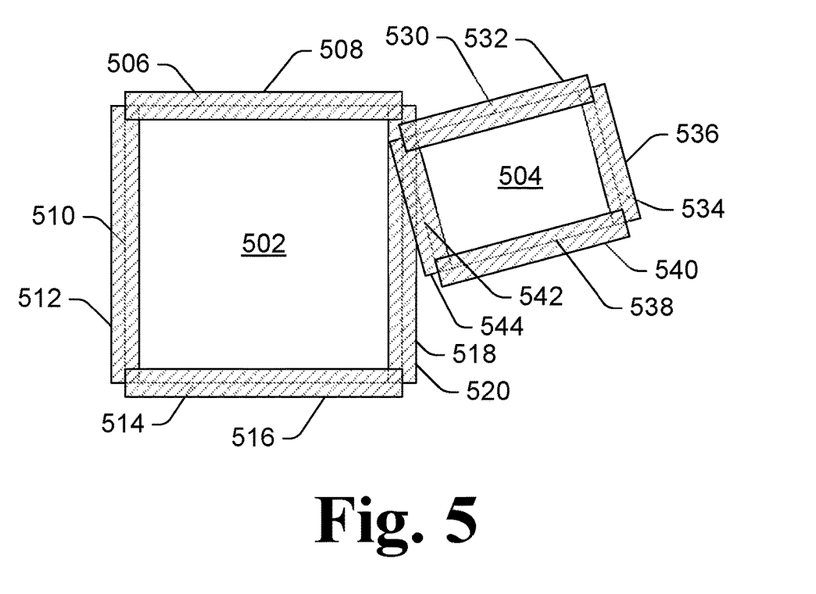
FIG. 5 illustrates an example of elements with extruded edges in accordance with one or more embodiments.

FIG. 5 illustrates an example of elements with extruded edges in accordance with one or more embodiments. Two elements 502 and 504 are illustrated in FIG. 5. For purposes of discussion, assume that element 502 is an existing element in a mesh, and element 504 is a new element. Element 502 includes an edge 506 having an extruded area 508 illustrated with an angled line pattern. Similarly, element 502 includes an edge 510 having an extruded area 512 illustrated with an angled line pattern, an edge 514 having an extruded area 516 illustrated with an angled line pattern, and an edge 518 having an extruded area 520 illustrated with an angled line pattern. Element 504 includes an edge 530 having an extruded area 532 illustrated with an angled line pattern, an edge 534 having an extruded area 536 illustrated with an angled line pattern, an edge 538 having an extruded area 540 illustrated with an angled line pattern, and an edge 542 having an extruded area 544 illustrated with an angled line pattern.

As illustrated in FIG. 5, the extruded area 544 of edge 542 intersects the extruded area 520 of edge 518, thus the edge intersection condition 410 is satisfied for edge 542 of the new element 504 and the target edge 518. Additionally, the extruded area 532 of the edge 530 intersects the extruded area 530 of edge 518, thus the edge intersection condition 410 is satisfied for the edge 530 of the new element 504 and the target edge 518. As no extruded area of an edge of the new element 504 intersects the extruded areas 508, 512, and 516, the edge intersection condition 410 is not satisfied for any edges of the new element 504 and any of the edges 506, 510, and 514 of element 502.

Returning to FIG. 4, the angle condition 412 is satisfied if the lowest angle between an edge of the new element and the target edge satisfies a threshold value. In one or more embodiments the threshold value is in the range of 40-45 degrees (e.g., 45 degrees). In situations in which multiple edges of the new element intersect a target edge or the distance between each of multiple edges of the new element and the target edge satisfy a threshold value, then one of the multiple edges is selected as the edge which may snap to the target edge. The selected one of the multiple edges is the one of the multiple edges having a lower angle from the target edge to the one of the multiple edges.

Figure 6:
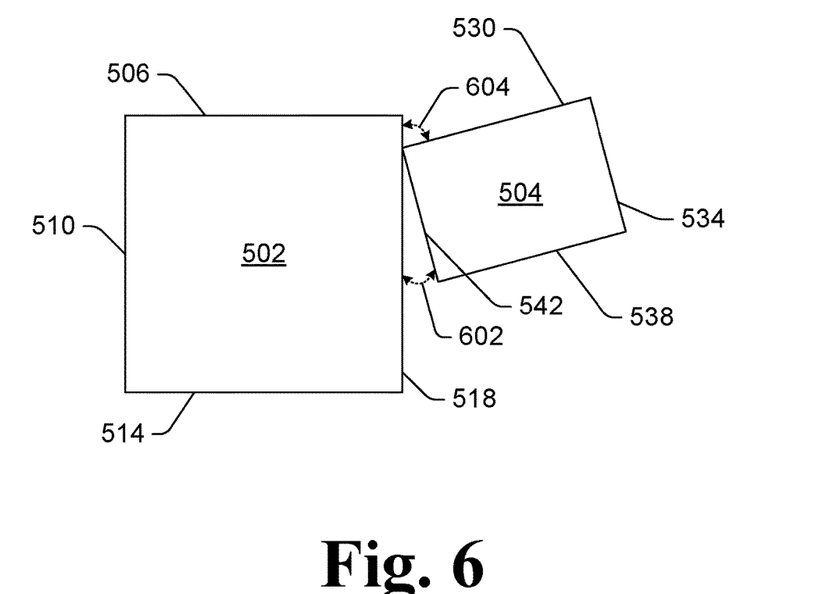
FIG. 6 illustrates another example of elements with edges in accordance with one or more embodiments.

FIG. 6 illustrates another example of elements with edges in accordance with one or more embodiments. Two elements 502 and 504 are illustrated in FIG. 6, analogous to the illustration of FIG. 5 except that the extruded areas are not illustrated. Element 502 includes edges 506, 510, 514, and 518. Element 504 includes edges 530, 534, 538, and 542. As discussed above with reference to FIG. 5, the edge intersection condition 410 is satisfied for edge 542 of the new element 504 and the target edge 518, and the edge intersection condition 410 is also satisfied for the edge 530 of the new element 504 and the target edge 518.

As illustrated in FIG. 5, the angle 602 from edge 518 to edge 542 satisfies a threshold value (e.g., 45 degrees), so the angle condition 412 is satisfied for edge 542 of the new element 504 and the target edge 518. However, the angle 604 from edge 518 to edge 530 does not satisfy the threshold value (e.g., 45 degrees), so the angle condition 412 is not satisfied for the edge 530 of the new element 504 and the target edge 518.

If the situation where to arise in which the angle from edge 518 to edge 530 did satisfy then threshold value, then two angles would be determined: one from the edge 518 to the edge 530 and the other from the edge 518 to the edge 542. The angle condition 412 is satisfied for the one of the edges 530 and 542 for which the smaller angle from the edge 518 is determined, and the angle condition is not satisfied for the other of the edges 530 and 542.

Returning to FIG. 4, the overlap condition 414 is that the amount of the target edge that is overlapped by the edge of the new element satisfies a threshold value. In one or more embodiments, the threshold value is in the range of 40-50% (e.g., 50%). The overlap is determined by extending or projecting the edge of the new element to the target edge, and determining the amount of the target edge that the extended or projected edge occupies.

Figure 7:
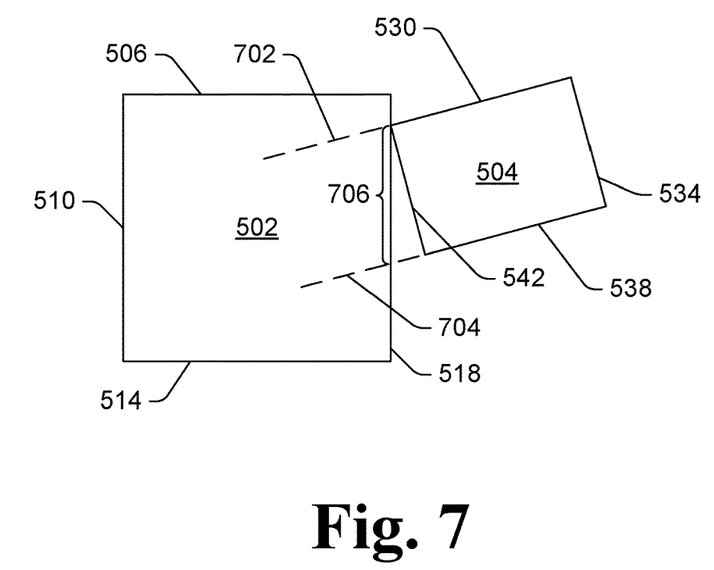
FIG. 7 illustrates an example of an element edge overlapping another element edge in accordance with one or more embodiments.

FIG. 7 illustrates an example of an element edge overlapping another element edge in accordance with one or more embodiments. Two elements 502 and 504 are illustrated in FIG. 7, analogous to the illustration of FIG. 5 except that the extruded areas are not illustrated. Element 502 includes edges 506, 510, 514, and 518. Element 504 includes edges 530, 534, 538, and 542. The edge 542 of element 504 is extended or projected on the target edge 518 of element 502, illustrated by dashed line 702 and dashed line 704. Dashed line 702 is determined by extending a line towards the target edge 518 from the vertex between edges 542 and 530 and at an angle perpendicular to the edge 542. Dashed line 704 is determined by extending a line towards the target edge 518 from the vertex between edges 542 and 538 and at an angle perpendicular to the edge 542. The length of the portion of edge 518 between where the extended lines intersect the edge 518 is the amount of the target edge 518 that is overlapped by the edge 542, and is illustrated as overlap amount 706.

Returning to FIG. 4, the element intersection condition 416 is that the element resulting from snapping the new element to the target edge would not intersect other elements of the mesh. Two elements intersect if any portion of the interior of one of the two elements (the area within the edges of the one element) occupies the same space (e.g., when displayed) as the interior or the other of the two elements (the area within the edges of the other of the two elements). Thus, two elements can share an edge without intersecting, but cannot share any interior portions.

By way of example, referring again to FIGS. 5-7, if the element 504 were snapped to the edge 518 of the element 502 so that the edge 518 and the edge 542 were the same shared edge, then the element 504 would not intersect the element 502. Thus, the element intersection condition 416 is satisfied by the target edge 518 for the edge 542 of element 504. However, if the element 504 were snapped to the edge 510 of the element 502 so that the edge 510 and the edge 542 were the same edge, then the element 504 would intersect the element 502. Thus, the element intersection condition 416 is not satisfied by the target edge 510 for the edge 542 of element 504. Thus, it can be seen that in order to satisfy the element intersection condition 416, the new element and the existing element including the target edge would be on either side of the target edge.

In one or more embodiments, when the new element is snapped to a target edge, as part of the snapping process the length of the edge of the new element that shares the target edge with the existing element is changed to be the same length as the target edge. Other edges of the new element are changed as appropriate so that the element maintains the same number of edges. Thus, the user need not alter the locations of edges or vertices of the new element; rather the location of the edge and vertices of the new element are automatically changed as appropriate so that the edge of the new element shares the target edge with the existing element.

Figure 8:
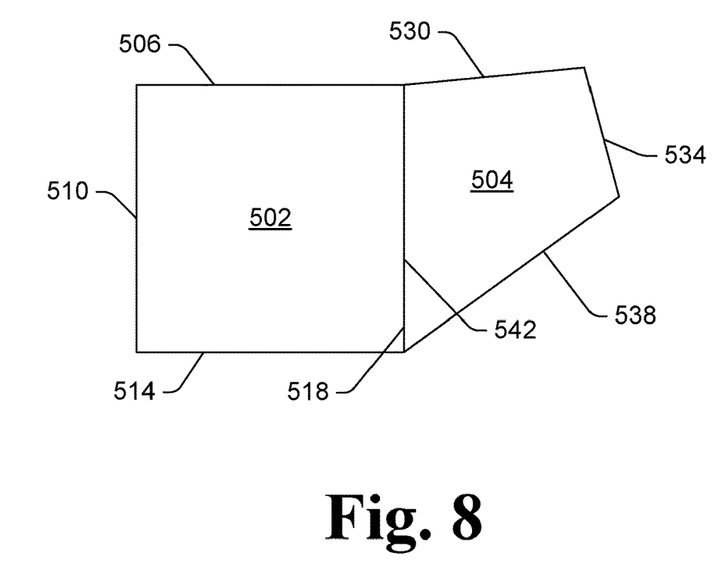
FIG. 8 illustrates an example of an element being snapped to another element in accordance with one or more embodiments.

FIG. 8 illustrates an example of an element being snapped to another element in accordance with one or more embodiments. FIG. 8 illustrates the result of snapping the new element 504 of FIG. 7 to the target edge 518 of the existing element 502 of FIG. 7. As illustrated, the edge 542 is changed to be the same length as the target edge 518. Changing the length of the edge 542 changes the vertex between edges 542 and 530, and thus changes line 530 as illustrated. Similarly, changing the length of the edge 542 changes the vertex between edges 542 and 538, and thus changes line 538 as illustrated. However, the vertex between edges 530 and 534 is not changed, and the vertex between edges 534 and 538 is not changed. Thus, snapping the new element 504 to the target edge 518 changes the shape of the new element 504, although the new element 504 remains a quadrilateral.

Various different changes can be made to the new element when changing the length of the edge 542. In one or more embodiments, the vertices of the new element 504 that are not endpoints of the line 542 are not changed. Alternatively, the edges or vertices of the new element 504 can be changed in other manners. For example, the edges or vertices of the new element 504 can be changed so that the new element 504 has a particular default shape (e.g., a square or a trapezoid). By way of another example, the edges or vertices of the new element 504 can be changed so that the new element 504 has the same shape as the new element 504 had prior to the changing of the length of the edge 542, so that the new element 504 has the same shape as the element 502, and so forth.

Additionally, in one or more embodiments as user input indicating to manipulate the new element is being received (e.g., act 206 of FIG. 2) and an indication of an edge of an existing mesh element to which the new element can be snapped is provided (e.g., act 210 of FIG. 2), the changes that would be made to the new element by snapping the new element to the indicated edge can also be provided to the user. For example, as the new element is manipulated, along with providing an indication that the new element 504 can be snapped to the edge 518 of existing element 502, the changed element 504 as illustrated in FIG. 8 can be displayed to the user. The changed element can continue to be displayed to the user until user input indicating a user desire to snap the new element to the edge 518 is received, or other user input indicating to cease displaying the changed element is received. This other user input can be, for example, an elapsed amount of time without user input manipulating the new element satisfying a threshold value, user input indicating a distance of movement of the new element away from the edge 518 satisfying a threshold value, and so forth.

The changed element can be displayed in different manners to allow the user to readily distinguish between existing elements of the mesh and a new element that has not yet been snapped to an edge of an existing element of the mesh. For example, the changed element can be displayed in a different color than existing elements, with a different brightness or animation than existing elements, and so forth.

Returning to FIG. 4, alternatively when the new element is snapped to a target edge as part of the snapping process, the length of the edge of the new element that shares the target edge with the existing element is not changed to be the same length as the target edge. The snapping process can be performed in different manners, such as rotating the element so that the edge of the new element has the same angle or orientation as the target edge, rotating the edge of the new element about a vertex of the element (an endpoint of the edge) so that the edge of the new element has the same angle or orientation as the target edge and other edges of the new element are changed as appropriate so that the element maintains the same number of edges.

In such embodiments in which the length of the edge of the new element that shares the target edge with the existing element is not changed, the location where the new element snaps to the target edge can vary. For example, the new element can snap to the target edge at a location such that the edge of the new element shares an endpoint with an endpoint of the target edge. By way of another example, the new element can snap to the target edge at a location that is a midpoint (or within a threshold amount of a midpoint) of the target edge. User input moving the new element along the target edge to identify the location where the new element snaps to the target edge can optionally be received.

The element vertex sharing condition 418 is that the number of vertices that the element resulting from snapping the new element to the target edge would share with other elements of the mesh satisfies a threshold value. In one or more embodiments this threshold value is 2 or 3, although other values can alternatively be used. If the number of vertices that the element resulting from snapping the new element to the target edge would share with other elements of the mesh satisfies the threshold value, then the element vertex sharing condition 418 is satisfied. However, if the number of vertices that the element resulting from snapping the new element to the target edge would share with other elements of the mesh does not satisfy the threshold value, then the element vertex sharing condition 418 is not satisfied.

The edge sharing condition 420 is that the number of elements of the mesh that the target edge is shared by satisfies a threshold value. In one or more embodiments this threshold value is 2 or 3, although other values can alternatively be used. If the number of elements that the target edge is shared by satisfies the threshold value, then the edge sharing condition 420 is satisfied. However, if the number of elements that the target edge is shared by does not satisfy the threshold value, then the edge sharing condition 420 is not satisfied.

In many of the discussions herein, reference is made to 2D elements. It should be noted that the techniques apply analogously to 3D elements, and combinations of 3D and 2D elements. For example, a 2D element can be snapped to a 3D element.

Figure 9:
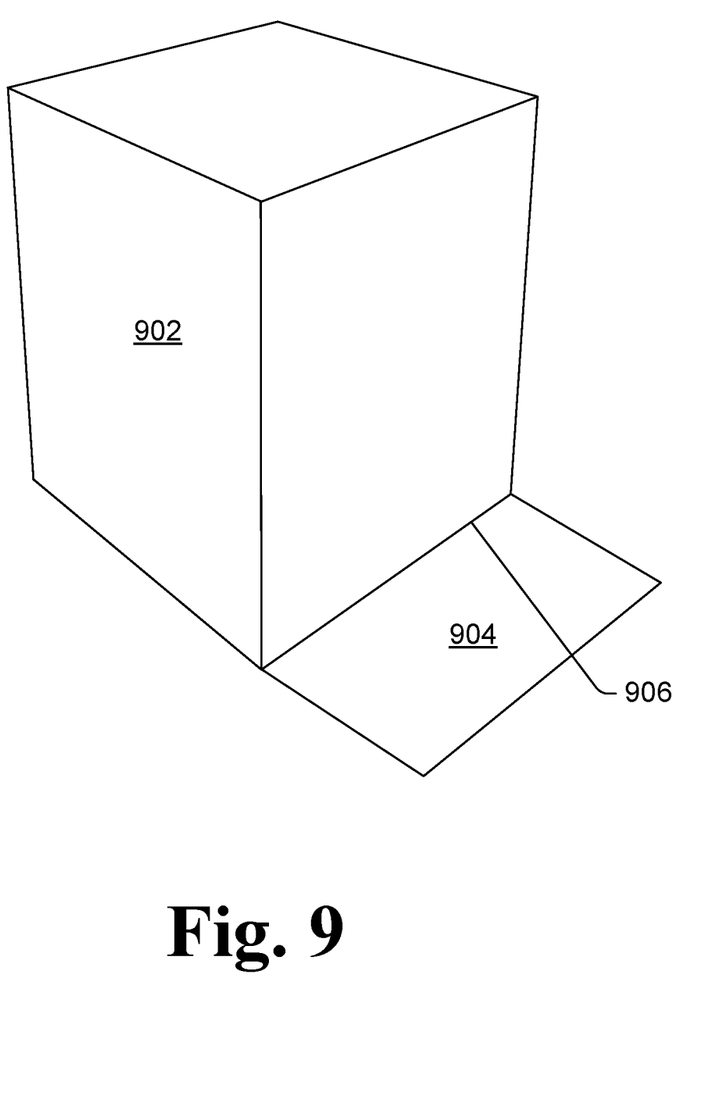
FIG. 9 illustrates an example of snapping a 2D element to a 3D element in accordance with one or more embodiments.

FIG. 9 illustrates an example of snapping a 2D element to a 3D element in accordance with one or more embodiments. FIG. 9 illustrates a 3D element that is a cube 902. A new element 904 that is a 2D element in the shape of a quadrilateral can be snapped to an edge of the cube 902. As illustrated, the new element 904 is snapped to an edge 906 of the cube 902.

The techniques discussed herein thus provide a user-friendly system to allow elements to be added to a mesh. A user can move or otherwise manipulate a new element around a display, and have presented to him or her indications of the edges of existing elements of a mesh to which the new element can be snapped. The user can have the new element snapped to the edge of an existing element of the mesh automatically—the user need not be concerned with changing vertices or edges of the new element in order to snap the new element to the edge of the existing mesh element.

For example, a user can depress a mouse button to indicate or select a new element, and while the mouse button is pressed move the mouse so that the new element moves about the display. When the new element is moved to a location where it can be snapped to a target edge of an existing element of the mesh desired by the user, the user can release the mouse button and the new element is automatically snapped to the target edge. As part of the snapping process the length of the edge of the new element that shares the target edge with the existing element is changed to be the same length as the target edge as discussed above.

Although particular functionality is discussed herein with reference to particular modules, it should be noted that the functionality of individual modules discussed herein can be separated into multiple modules, at least some functionality of multiple modules can be combined into a single module, and so forth.

Additionally, various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 10:
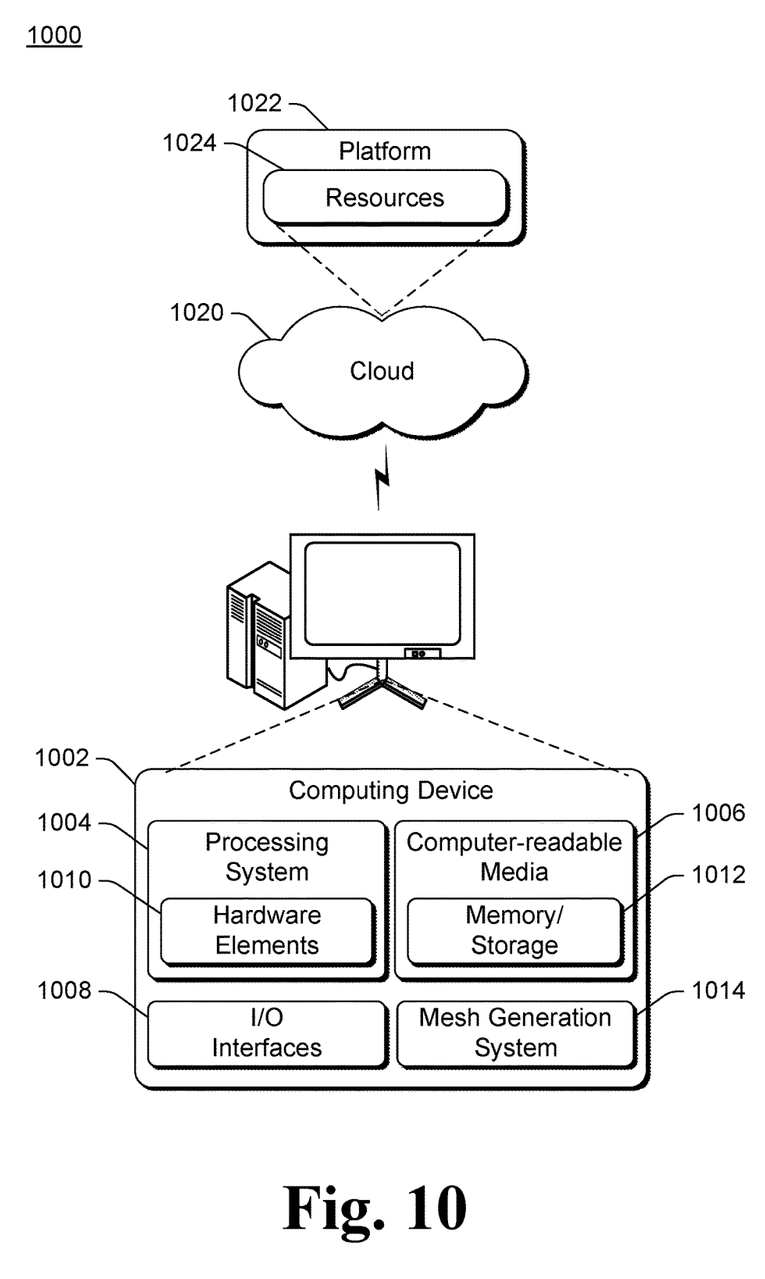
FIG. 10 illustrates an example system that includes an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. This is illustrated through inclusion of the mesh generation system 1014, which may be configured to implement the user interface facilitating mesh generation. Computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1004 is representative of functionality to perform one or more operations using hardware. Accordingly, processing system 1004 is illustrated as including hardware elements 1010 that may be configured as processors, functional blocks, and so forth. This may include implementation in hardware as an application specific integrated circuit or other logic device formed using one or more semiconductors. Hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 1006 is illustrated as including memory/storage 1012. Memory/storage 1012 represents memory/storage capacity associated with one or more computer-readable media. Memory/storage component 1012 may include volatile media (such as random access memory (RAM)) and/or nonvolatile media (such as read only memory (ROM), Flash memory, optical disks, magnetic disks, and so forth). Memory/storage component 1012 may include fixed media (e.g., RAM, ROM, a fixed hard drive, and so on) as well as removable media (e.g., Flash memory, a removable hard drive, an optical disc, and so forth). Computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 1002. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. Computing device 1002 may be configured to implement particular instructions and/or functions corresponding to the software and/or hardware modules. Accordingly, implementation of a module that is executable by computing device 1002 as software may be achieved at least partially in hardware, e.g., through use of computer-readable storage media and/or hardware elements 1010 of processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of computing device 1002 and are not limited to the specific examples of the techniques described herein. This functionality may also be implemented all or in part through use of a distributed system, such as over a "cloud" 1020 via a platform 1022 as described below.

Cloud 1020 includes and/or is representative of a platform 1022 for resources 1024. Platform 1022 abstracts underlying functionality of hardware (e.g., servers) and software resources of cloud 1020. Resources 1024 may include applications and/or data that can be utilized while computer processing is executed on servers that are remote from computing device 1002. Resources 1024 can also include services provided over the Internet and/or through a subscriber network, such as a cellular or Wi-Fi network.

Platform 1022 may abstract resources and functions to connect computing device 1002 with other computing devices. Platform 1022 may also serve to abstract scaling of resources to provide a corresponding level of scale to encountered demand for resources 1024 that are implemented via platform 1022. Accordingly, in an interconnected device embodiment, implementation of functionality described herein may be distributed throughout system 1000. For example, the functionality may be implemented in part on computing device 1002 as well as via platform 1022 that abstracts the functionality of the cloud 1020.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   presenting a mesh including one or more existing elements on a display;
   identifying a new element to be added to the mesh;
   receiving a first input indicating to manipulate the new element on the display;
   determining, as the new element is manipulated on the display, one or more edges of the one or more existing elements to which the new element can be snapped, wherein snapping the new element to an edge of one of the one or more existing elements comprises adding the new element to the mesh so that the new element shares the edge with the one existing element; and
   providing, in response to the new element being situated at a location on the display at which the new element can be snapped to an edge of one of the one or more existing elements:
      an indication of the edge of the one existing element to which the new element can be snapped; and
      a display of a change that would be made to the new element by snapping the new element to the indicated edge.

2. A method as recited in claim 1 further comprising providing an indication of the changed new element.

3. A method as recited in claim 2, the providing an indication of the changed new element comprising displaying the changed new element in a different color than the one or more existing elements.

4. A method as recited in claim 1 further comprising providing an indication of the edge of the new element that can be snapped to the edge of the one existing element.

5. A method as recited in claim 1, the providing the user-discernable indication of the edge comprising highlighting the edge.

6. A method as recited in claim 1, further comprising:
   receiving a second input indicating a user desire to snap the new element to the edge of the one existing element; and
   snapping, in response to the second input, the new element to the mesh so that the new element shares the edge with the one existing element.

7. A method as recited in claim 6, further comprising changing the length of an edge of the new element that is shared with the one existing element so that the edge of the new element is a same length as the edge of the one existing element.

8. A method as recited in claim 6, further comprising changing the size of the new element such that the length of an edge of the new element that is shared with the one existing element is the same length as the edge of the one existing element and the shape of the new element is retained.

9. A method as recited in claim 6, further comprising rotating the edge of the new element about a vertex of the new element so that the edge of the new element has the same angle or orientation as the target edge and other edges of the new element are changed as appropriate so that the new element maintains the same number of edges.

10. A method as recited in claim 6, wherein snapping the new element to the mesh comprises the new element sharing an endpoint with an endpoint of the target edge.

11. A method as recited in claim 6, wherein snapping the new element to the mesh comprises snapping an endpoint of the new element to a midpoint of the target edge.

12. A method as recited in claim 1, the determining comprising evaluating multiple conditions for a target edge of one of the one or more existing elements to determine whether the new element can be snapped to the target edge of the one existing element, the multiple conditions including:
   the target edge intersects an edge of the new element or a distance between the target edge and the edge of the new element satisfies a first threshold value;
   an angle between the target edge and the edge of the new element satisfies a second threshold value;
   an amount of the target edge that is overlapped by the edge of the new element satisfies a third threshold value;
   the new element, when snapped to the target edge, intersects no other existing elements of the mesh;
   a number of vertices that the new element, when snapped to the target edge, would share with other existing elements of the mesh satisfies a fourth threshold value; and
   a number of existing elements that the target edge is shared by satisfies a fifth threshold value.

13. A computing device comprising:
   an output module configured to present a mesh including one or more existing elements on a display;
   an input module configured to receive an input indicating to manipulate on the display a new element to be added to the mesh; and
   a mesh generation system configured to:
      determine, as the new element is manipulated on the display, one or more edges of the one or more existing elements to which the new element can be snapped, wherein snapping the new element to an edge of one of the one or more existing elements comprises adding the new element to the mesh so that the new element shares the edge with the one existing element; and
      provide, in response to the new element being situated at a location on the display at which the new element can be snapped to an edge of one of the one or more existing elements:
         an indication of the edge of the one existing element to which the new element can be snapped; and
         a display of a change that would be made to the new element by snapping the new element to the indicated edge.

14. A computing device as recited in claim 13 further comprising providing an indication of the edge of the new element that can be snapped to the edge of the one existing element.

15. A computing device as recited in claim 13, the mesh generation system being further configured to:
   receive an additional input indicating to snap the new element to the indicated edge of the one existing element; and
   add, in response to the additional input, the new element to the mesh so that the new element shares the indicated edge with the one existing element.

16. A computing device as recited in claim 13, the mesh generation system being further configured to determine one or more edges of the one or more existing elements to which the new element can be snapped by evaluating multiple conditions for a target edge of one of the one or more existing elements to determine whether the new element can be snapped to the target edge of the one existing element, the multiple conditions including:

the target edge intersects an edge of the new element or a distance between the target edge and the edge of the new element satisfies a first threshold value;

an angle between the target edge and the edge of the new element satisfies a second threshold value;

the new element, when snapped to the target edge, intersects no other existing elements of the mesh;

a number of vertices that the new element, when snapped to the target edge, would share with other existing elements of the mesh satisfies a third threshold value; and     a number of existing elements that the target edge is shared by satisfies a fourth threshold value.

17. A method comprising:

displaying a mesh including multiple existing elements;

identifying a new element to be added to the mesh;

receiving an input indicating to move the new element;

determining, as the new element is moved, one or more edges of the multiple existing elements to which the new element can be snapped, wherein snapping the new element to an edge of one of the multiple existing elements comprises adding the new element to the mesh so that the new element shares the edge with the one existing element; and providing, in response to the new element being moved so that the new element can be snapped to an edge of one of the multiple existing elements:

an indication of the edge of the one of the multiple existing elements to which the new element can be snapped; and     a display of a change that would be made to the new element by snapping the new element to the indicated edge.

18. A method as recited in claim 17, the new element as well as each of the multiple existing elements comprising a convex quadrilateral.

19. A method as recited in claim 17, further comprising:

receiving an additional input indicating to snap the new element to the indicated edge of the one existing element; and adding, in response to the additional input, the new element to the mesh so that the new element shares the indicated edge with the one existing element.

20. A method as recited in claim 17, the determining comprising evaluating multiple conditions for a target edge of one of the multiple existing elements to determine whether the new element can be snapped to the target edge of the one existing element, the multiple conditions including:

the target edge intersects an edge of the new element or a distance between the target edge and the edge of the new element satisfies a first threshold value;

an angle between the target edge and the edge of the new element satisfies a second threshold value;

the new element, when snapped to the target edge, intersects no other existing elements of the mesh;

a number of vertices that the new element, when snapped to the target edge, would share with other existing elements of the mesh satisfies a third threshold value; and     a number of existing elements that the target edge is shared by satisfies a fourth threshold value.

\* \* \* \* \*